(12) United States Patent
Aiba et al.

(10) Patent No.: US 8,598,821 B2
(45) Date of Patent: Dec. 3, 2013

(54) INVERTER CONTROL DEVICE FOR AC MOTOR AND ELECTRIC COMPRESSOR

(75) Inventors: Kenichi Aiba, Aichi (JP); Takayuki Takashige, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 62 days.

(21) Appl. No.: 13/127,613

(22) PCT Filed: Feb. 18, 2010

(86) PCT No.: PCT/JP2010/001062
§ 371 (c)(1),
(2), (4) Date: Jun. 22, 2011

(87) PCT Pub. No.: WO2010/095445
PCT Pub. Date: Aug. 26, 2010

(65) Prior Publication Data
US 2011/0243757 A1 Oct. 6, 2011

(30) Foreign Application Priority Data

Feb. 19, 2009 (JP) .................................. 2009-037197

(51) Int. Cl.
*H02P 6/14* (2006.01)
*H02P 1/04* (2006.01)

(52) U.S. Cl.
USPC ................. 318/400.26; 318/400.17; 318/599; 318/504; 417/45

(58) Field of Classification Search
USPC ........... 417/45; 318/504, 400.26, 400.17, 599
See application file for complete search history.

(56) References Cited

U.S. PATENT DOCUMENTS

| 6,704,212 B2 * | 3/2004 | Furukawa et al. ............... 363/41 |
| 6,725,681 B2 * | 4/2004 | Adaniya et al. ............... 62/228.5 |
| 7,049,778 B2 * | 5/2006 | Katanaya ................. 318/400.04 |
| 7,804,266 B2 * | 9/2010 | Tomigashi ..................... 318/599 |

FOREIGN PATENT DOCUMENTS

| JP | 8-019263 A | 1/1996 |
| JP | 2005-045848 A | 2/2005 |
| JP | 2008-170017 A | 7/2008 |
| JP | 2008-220117 A | 9/2008 |

OTHER PUBLICATIONS

Notification of Transmittal of Translation of the International Preliminary Report on Patentability of International Application No. PCT/JP2010/001062 mailed Sep. 22, 2011 with Forms PCT/IB/373 amd PCT/ISA/237.
International Search Report of PCT/JP2010/001062, date of mailing May 11, 2010.

* cited by examiner

*Primary Examiner* — Lincoln Donovan
*Assistant Examiner* — Bickey Dhakal
(74) *Attorney, Agent, or Firm* — Westerman, Hattori, Daniels & Adrian, LLP

(57) ABSTRACT

The present invention has an object to detect a three-phase AC motor current with high accuracy only with DC input current measuring means to a three-phase PWM inverter, and reduce resonance of a DC power supply by a ripple current in driving an AC motor with a DC current via a three-phase PWM inverter. A carrier wave Cry_e earlier than that of a V phase is used to sample a U phase and a carrier wave Cry_l always later than that of the V phase is used to sample a W phase. Thus, a sampling time sufficiently longer than an interval Ts of the carrier waves Cry_e, Cry_m and Cry_l can be ensured, and the current can be easily detected.

1 Claim, 20 Drawing Sheets

1 U-PHASE CURRENT

2 V-PHASE CURRENT

3 W-PHASE CURRENT

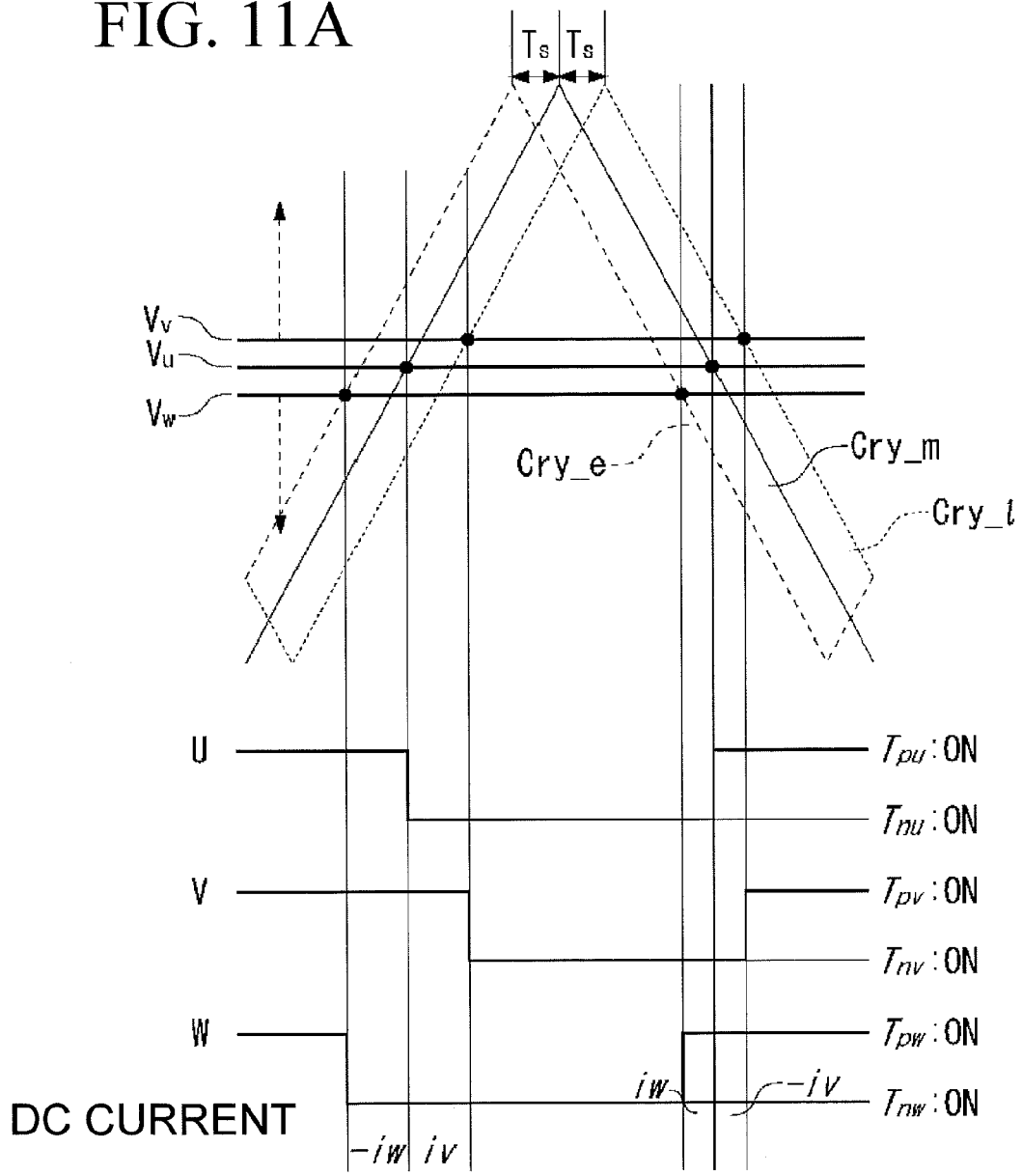

INVERTER CONTROL DEVICE FOR AC MOTOR AND ELECTRIC COMPRESSOR

TECHNICAL FIELD

The present invention relates to an inverter control device for an AC motor and an electric compressor that detects a three-phase AC motor current with high accuracy using only DC input current measuring means to a three-phase PWM inverter in driving the AC motor with a DC current via the three-phase PWM inverter.

BACKGROUND ART

As shown in FIG. 13, there is a control device that drives an AC motor 80 with a DC power supply 82 via a three-phase PWM inverter main circuit 81. Such a control device generates PWM waveforms Ea, Eb and Ec by level comparison between sine wave signals Va, Vb and Vc of each phase and a carrier wave signal C of a triangular wave as shown in FIG. 14. Then, by applying the PWM waveforms, each switching element of the three-phase PWM inverter main circuit 81 is controlled in switching to obtain a sine wave output. In FIG. 14, reference characters Vab and Van refer to a line voltage and a phase voltage, respectively.

A sine wave level and a phase are controlled to control an output current and a phase supplied from the three-phase PWM inverter main circuit 81 to a load such as an induction motor IM (AC motor) 80 or a permanent magnet motor (AC motor) not shown in FIG. 13. In order to detect a current used for the control, in vector control, an output current at three points P1 to P3 connecting the main circuit and the load is detected for three phases (or two phases) by a current sensor using a Hall CT.

However, a general purpose inverter intended to reduce cost is demanded to reduce the number of current sensors. Thus, there is a method of providing only one current sensor on a DC side (point P4 in FIG. 13) of a PWM inverter, and calculating an output current from the DC current. However, in this method, a voltage E of a DC power supply 82 of the PWM inverter is substantially constant, and thus an average value of detected DC currents changes in proportional to an output frequency of the inverter. Thus, the average value of the DC currents at low frequency is small, which reduces current detection accuracy to make it difficult to obtain high performance.

To address these problems, for example, Patent Document 1 discloses an output current detection device of a PWM inverter that uses the fact that current information (−Iw and Iu) of two phases: a minimum phase (Vw*) and a maximum phase (Vu*) of a voltage command value appear twice within a PWM carrier wave period in a DC input current IDC of a PWM inverter, samples a DC input current IDC based on PWM pulse signals, distributes the DC input current IDC for each phase, and detects three-phase current detection values.

However, in a current detection method disclosed in Patent Document 1, for example, as shown in FIG. 15, when an intermediate phase Vv of three-phase voltage command values Vu, Vv and Vw (corresponding to Va, Vb and Vc in FIG. 14) is close to a maximum phase Vu or a minimum phase Vw, or when an output voltage level is low, rising edges of a three-phase PWM signal are close to each other to reduce a pulse width, thereby making current detection impossible. Thus, Patent Document 2 discloses a control device and a control method for an AC motor and a module that automatically reduces carrier wave frequency of an inverter to increase a pulse width in the above-described case, and facilitates current detection.

However, in the method shown in Patent Document 2, problems such as generation of noise or reduced efficiency that occurs when the entire carrier wave frequency is reduced can be solved, but the carrier wave frequency is reduced only when the intermediate phase of the voltage command values is close to the maximum or minimum phase, or when the output voltage level is low. Thus, the carrier wave frequency is reduced by software, which is considerably difficult.

Thus, the applicant has already proposed a control device for an AC motor as described below (see Patent Document 3).

Specifically, there is proposed a control device for an AC motor that includes DC input current measuring means to a three-phase PWM inverter that drives the AC motor by inputting DC, and estimates a current to the AC motor from a measurement result of the DC input current measuring means to control the AC motor, including: an AC motor current detection unit that is connected to the DC input current measuring means and calculates each of three-phase currents in the AC motor; a three-phase voltage command calculation unit that calculates a three-phase voltage command provided to the AC motor from the three-phase currents calculated by the AC motor current detection unit; and a three-phase PWM waveform creation unit that has a carrier wave generation unit that generates carrier waves having a certain interval, and generates a three-phase PWM inverter control signal by level comparison between three-phase voltage reference signals of a U phase, a V phase and a W phase that constitute the three-phase voltage command calculated by the three-phase voltage command calculation unit and the carrier waves generated by the carrier wave generation unit, wherein the three-phase PWM inverter control signal is generated by level comparison between the three-phase voltage reference signals and the carrier waves.

As such, the carrier waves having a certain interval are generated by the carrier wave generation unit, and the three-phase voltage reference signals of the U phase, the V phase and the W phase calculated by the three-phase voltage command calculation unit are compared with the carrier waves generated by the carrier wave generation unit. Thus, for example, even when an intermediate phase of voltage command values is close to a maximum or minimum value or when an output voltage level is low, a plurality of, for example, two or three carrier waves have a certain interval. This prevents rising ends of a three-phase PWM signal from being close to each other to reduce a pulse width, prevents current detection from being made impossible, and allows current detection with high accuracy using an easy and simple configuration.

CITATION LIST

Patent Document

Patent Document 1: Japanese Patent Laid-Open No. 8-19263
Patent Document 2: Japanese Patent Laid-Open No. 2005-45848
Patent Document 3: Japanese Patent Laid-Open No. 2008-220117

SUMMARY OF INVENTION

Problems to be Solved by the Invention

In the control device for an AC motor disclosed in Patent Document 3 as described above, as shown in FIG. 16, the three-phase PWM inverter control signals are generated by level comparison between the carrier waves having a certain interval and the voltage reference signals of the U phase, the V phase and the W phase. This prevents rising ends of three-phase PWM signal from being close to each other to reduce a pulse width, and allows current detection. On the other hand, as shown in FIG. 17, a ripple current (a harmonic current superimposed on a DC current) flowing through a DC bus of a circuit is increased.

As shown in FIG. 18, in a control device connected to an AC power supply 1 such as a commercial power supply, a capacitor 3 having a large capacity can be provided in a DC bus 2 for rectification, and thus there is little influence of a ripple current on the AC power supply 1.

On the other hand, as shown in FIG. 19, in a control device connected to a DC power supply 82, there is no need for rectification, and a capacitor 5 provided in a DC bus 2 has a small capacity, and thus a ripple current flows into the DC power supply 82. Then, if a resonance frequency on a side of the DC power supply 82 is close to a frequency of the ripple current, the side of the DC power supply 82 is resonated by the ripple current, which may cause trouble to other devices connected to the DC power supply 82.

Conventionally, in on-vehicle air conditioners, a compressor is driven by an engine. In recent years, in so-called hybrid vehicles or electric vehicles, a compressor is driven by a motor (AC motor) rotated by a current supplied from an on-vehicle battery as a DC power supply. When the motor of such an on-vehicle electric compressor is controlled by the control device having a configuration as shown in FIG. 19, various devices are connected to the on-vehicle battery. Thus, reducing resonance of the DC power supply by the ripple current is an important challenge.

Also, when the capacitor 5 cannot be provided in the configuration as shown in FIG. 19, a carrier frequency component is increased by an influence of the ripple current.

The present invention is achieved in view of such technical problems, and has an object to provide an inverter control device for an AC motor and an electric compressor that can detect a three-phase AC motor current with high accuracy only with DC input current measuring means to a three-phase PWM inverter, and reduce resonance of a DC power supply by a ripple current in driving an AC motor with a DC current via a three-phase PWM inverter.

Solution to the Problems

To achieve the above-described object, the present invention provides an inverter control device for an AC motor that includes DC input current measuring means to a three-phase PWM inverter that drives the AC motor by inputting DC, and estimates a current supplied to the AC motor from a measurement result of the DC input current measuring means to control the AC motor, including: an AC motor current detection unit that is connected to the DC input current measuring means and calculates each of three-phase currents in the AC motor; a three-phase voltage command calculation unit that calculates a three-phase voltage command provided to the AC motor from the three-phase currents calculated by the AC motor current detection unit; and a three-phase PWM waveform creation unit that has a carrier wave generation unit that generates three carrier waves having a certain interval Ts, and generates a control signal of the three-phase PWM inverter by level comparison between three-phase voltage reference signals of a U phase, a V phase and a W phase that constitute the three-phase voltage command calculated by the three-phase voltage command calculation unit and the carrier waves generated by the carrier wave generation unit. The DC input current measuring means detects a DC current with a sampling time of the certain interval Ts or more for two phases among the U phase, the V phase and the W phase when the three carrier waves are increased and/or when the three carrier waves are reduced.

The DC current is thus detected to ensure a long sampling time.

The present invention also provides an electric compressor including: a compressor that constitutes an air conditioner; a motor for driving the compressor; and a control device that controls an operation of the motor, wherein the control device includes DC input current measuring means to a three-phase PWM inverter that drives the motor by inputting DC, and estimates a current supplied to the motor from a measurement result of the DC input current measuring means to control the motor. The control device includes: a motor current detection unit that is connected to the DC input current measuring means and calculates each of three-phase currents in the motor; a three-phase voltage command calculation unit that calculates a three-phase voltage command provided to the motor from the three-phase currents calculated by the motor current detection unit; and a three-phase PWM waveform creation unit that has a carrier wave generation unit that generates three carrier waves having a certain interval Ts, and generates a control signal of the three-phase PWM inverter by level comparison between three-phase voltage reference signals of a U phase, a V phase and a W phase that constitute the three-phase voltage command calculated by the three-phase voltage command calculation unit and the carrier waves generated by the carrier wave generation unit, and the DC input current measuring means detects a DC current with a sampling time of the certain interval Ts or more for two phases among the U phase, the V phase and the W phase when the three carrier waves are increased and/or when the three carrier waves are reduced.

The present invention also provides an electric compressor including: a compressor that constitutes an air conditioner; a motor for driving the compressor; and a control device that controls an operation of the motor, wherein the control device includes DC input current measuring means to a three-phase PWM inverter that drives the motor by inputting DC, and estimates a current supplied to the motor from a measurement result of the DC input current measuring means to control the motor. The control device includes: a motor current detection unit that is connected to the DC input current measuring means and calculates each of three-phase currents in the motor; a three-phase voltage command calculation unit that calculates a three-phase voltage command provided to the motor from the three-phase currents calculated by the motor current detection unit; a carrier wave generation unit that generates three carrier waves having a certain interval Ts; a three-phase PWM waveform creation unit that generates a control signal of the three-phase PWM inverter by level comparison between three-phase voltage reference signals of a U phase, a V phase and a W phase that constitute the three-phase voltage command calculated by the three-phase voltage command calculation unit and the carrier waves generated by the carrier wave generation unit, and the three-phase voltage command calculation unit changes the three-phase voltage reference signals of the U phase, the V phase and the W phase with time.

Such an electric compressor changes the three-phase voltage reference signals with time to increase a sideband of the current, thereby spreading spectrum and reducing a ripple current.

Advantageous Effects of Invention

According to the present invention, a sampling time sufficiently longer than the interval Ts of the carrier waves can be ensured, and the current can be easily detected.

Further, this reduces the sideband of the current flowing through a current sensor to concentrate spectrum. Then, frequency components of the current flowing through the DC input current measuring means are concentrated at a frequency of the carrier waves and n-fold thereof, thereby reducing frequency components around a resonance frequency on the side of the DC power supply, thereby reducing a ripple current. This can prevent resonance with the ripple current from causing trouble to other devices connected to the DC power supply.

The three-phase voltage reference signals are changed with time to increase the sideband of the current, thereby spreading spectrum and reducing carrier frequency components.

BRIEF DESCRIPTION OF DRAWINGS

FIGS. 11A and 11B are timing charts for illustrating that a three-phase PWM signal is generated using three carrier waves Cry_e, Cry_m and Cry_l by a different method.

DESCRIPTION OF EMBODIMENTS

Now, the present invention will be described in detail based on an embodiment shown in the accompanying drawings.

Figure 1:
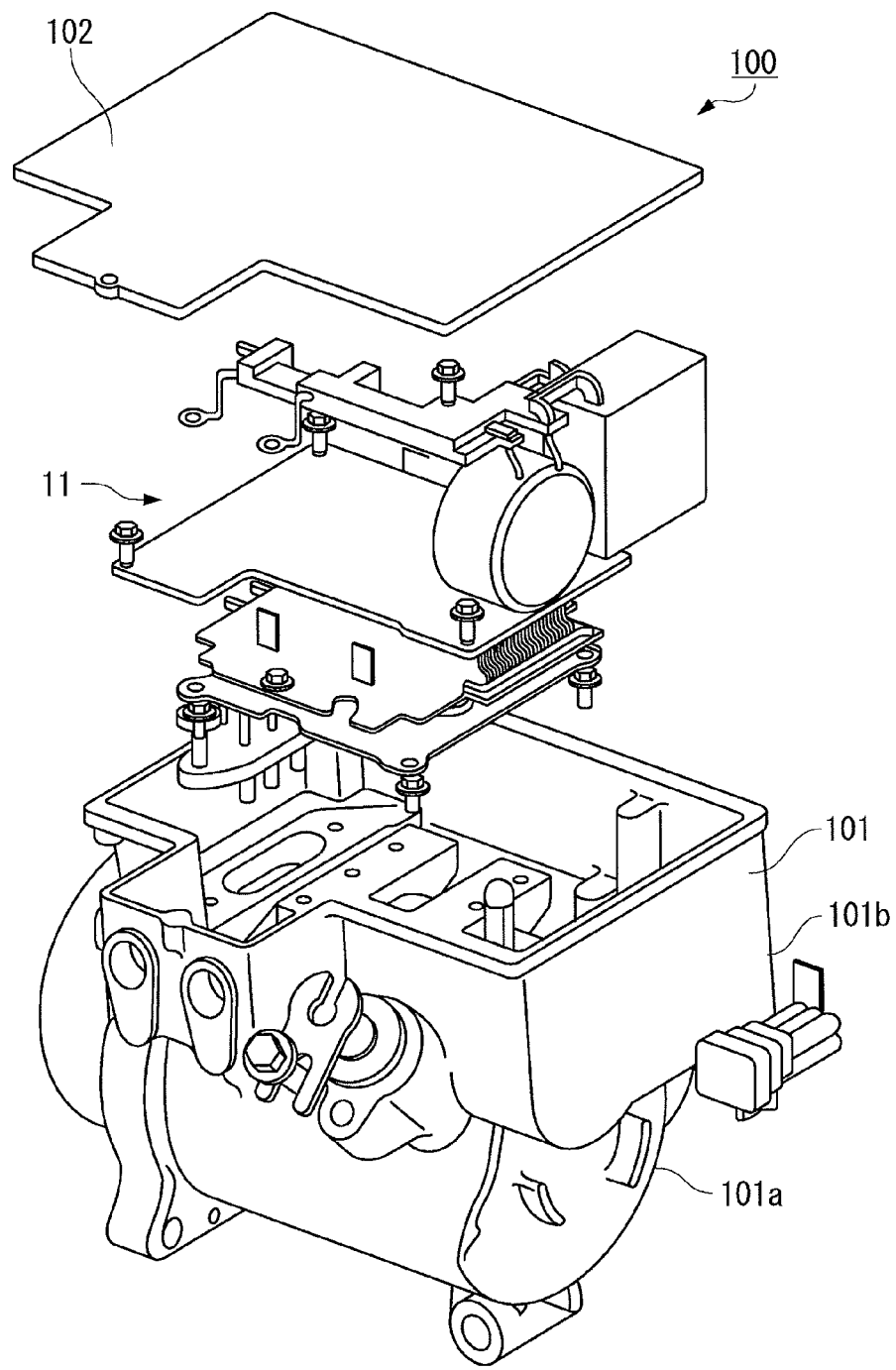
FIG. 1 shows an example of an electric compressor according to an embodiment.

FIG. 1 shows a configuration of an electric compressor (integral electric compressor) 100 according to an embodiment.

As shown in FIG. 1, in an electric compressor 100, a lower chamber 101a of a housing 101 houses a motor (AC motor) 10 (see FIG. 2) and a scroll compressor. Further, in the electric compressor 100, an upper chamber 101b opening upward of the housing 101 houses an inverter control device (control device) 11, and the upward opening of the upper chamber 101b is covered with a cover 102.

Figure 2:
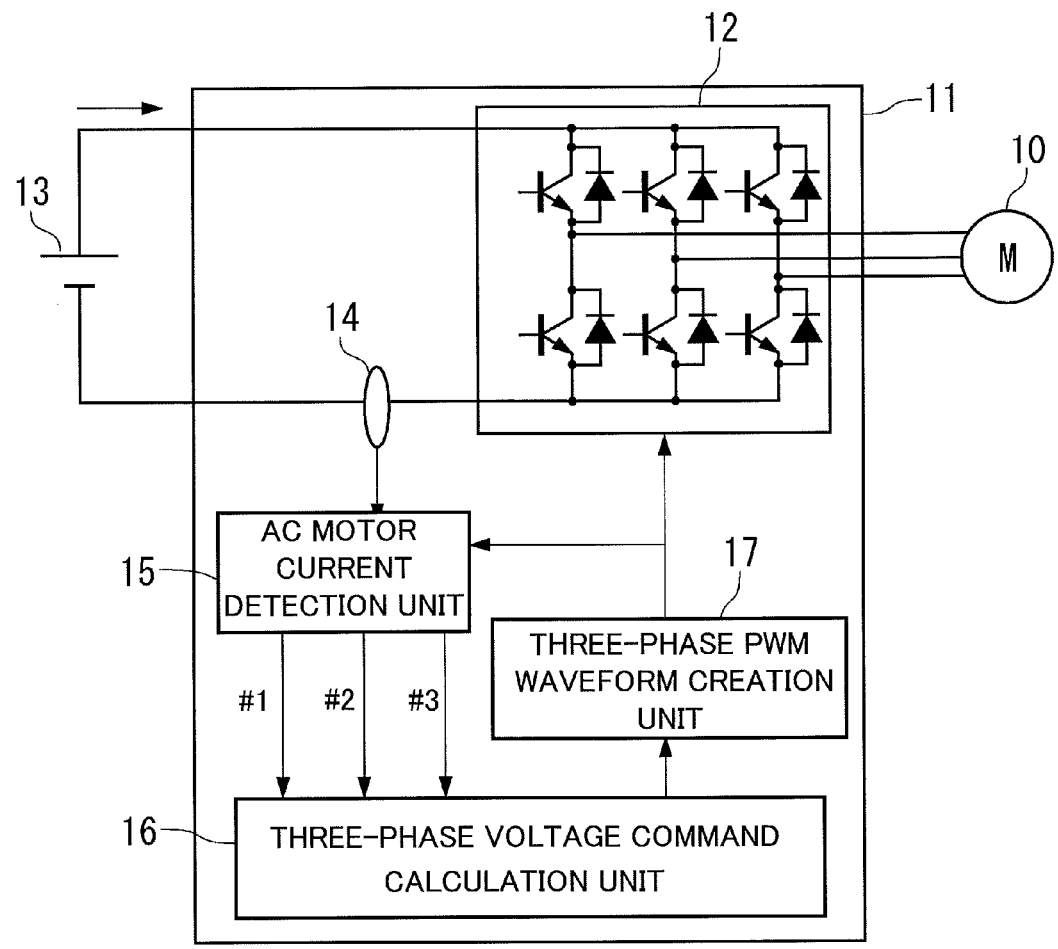
FIG. 2 shows an electric circuit configuration of the electric compressor shown in FIG. 1.

FIG. 2 shows an electric circuit configuration of the electric compressor 100 shown in FIG. 1.

As shown in FIG. 2, in the electric compressor 100, the inverter control device 11 controls supply of a current from a DC power supply 13 constituted by an on-vehicle battery to the motor 10 to operate the motor 10, and the motor 10 drives a scroll compressor. Then, a refrigerant is sucked into the housing 101 through a refrigerant suction port formed in an end of the lower chamber 101a on a side provided with the motor 10, and the refrigerant is compressed by the compressor. Then, the refrigerant compressed by the compressor is discharged through a refrigerant discharge port formed in an end on a side provided with the compressor.

The inverter control device 11 includes a three-phase PWM inverter main circuit (three-phase PWM inverter) 12, a current sensor (DC input current measuring means) 14 constituted by shunt resistance that measures a current flowing from the DC power supply 13 to the three-phase PWM inverter main circuit 12, an AC motor current detection unit 15 that calculates three-phase currents of a U phase current, a V phase current, and a W phase current of the motor 10 from a measurement result of the current sensor 14, a three-phase voltage command calculation unit 16 that calculates a three-phase voltage command based on a calculation result of the AC motor current detection unit 15, and a three-phase PWM waveform creation unit 17 that creates a three-phase PWM waveform provided to the three-phase PWM inverter main circuit 12 by the three-phase voltage command from the three-phase voltage command calculation unit 16.

Figure 3:
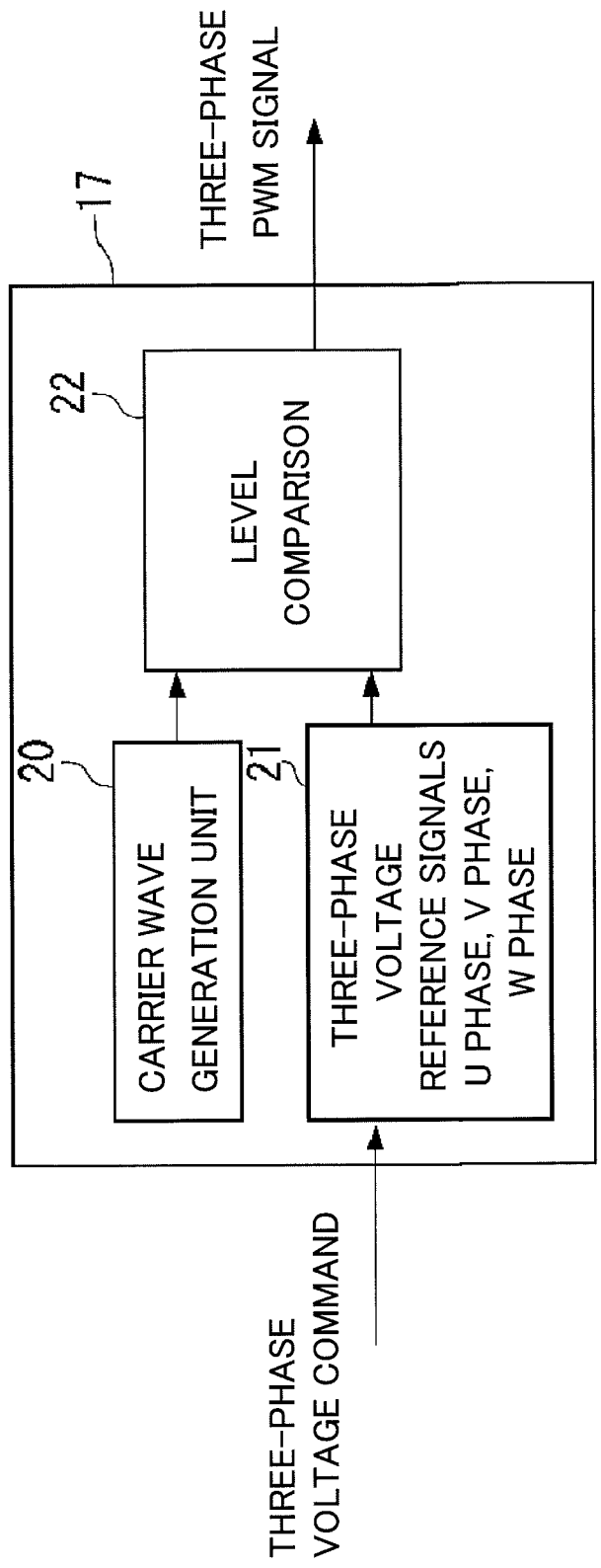
FIG. 3 shows a functional configuration of a three-phase PWM waveform creation unit.
Figure 4:
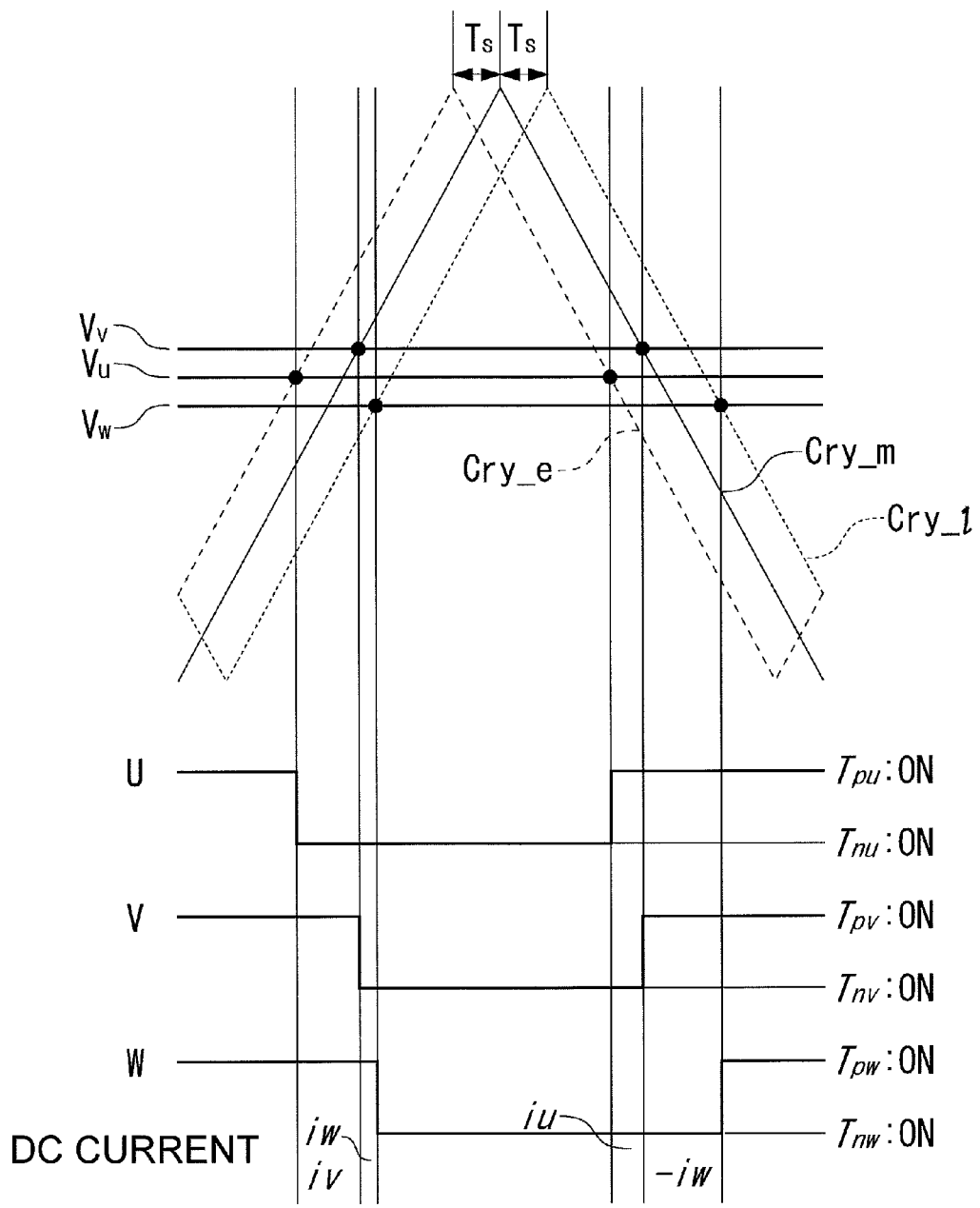
FIG. 4 is a timing chart for illustrating that a three-phase PWM signal is generated using three carrier waves Cry_e, Cry_m and Cry_l in an inverter control device.

FIG. 3 shows a configuration of the three-phase PWM waveform creation unit 17, and FIG. 4 is a timing chart for illustrating that a three-phase PWM signal is generated using three carrier waves Cry_e, Cry_m and Cry_l in the inverter control device 11.

The three-phase PWM waveform creation unit 17 includes, as its configuration shown in FIG. 3, three carrier wave generation units 20 that generate the three carrier waves Cry_e, Cry_m and Cry_l having a certain interval Ts as shown in FIG. 4, a three-phase voltage reference signal generation unit 21 that generates different voltage reference signals Vu, Vv and Vw of three-phases (U phase, V phase, W phase) based on the three-phase voltage command calculated by the three-phase voltage command calculation unit 16, and a level comparison unit 22 that compares the three carrier waves Cry_e, Cry_m and Cry_l generated by the carrier wave generation unit 20 with the three-phase voltage reference signals generated by the three-phase voltage reference signal generation unit 21 to generate a three-phase PWM signal.

An operation of the inverter control device 11 will be described. The current sensor 14 measures the current flowing from the DC power supply 13 to the three-phase PWM inverter main circuit 12 and transmits the current to the AC motor current detection unit 15. The AC motor current detection unit 15 generates three-phase currents: a W-phase current iw, a U-phase current iu, and a V-phase current iv(iu−iw) from the transmitted current (for example, IDC) flowing through the three-phase PWM inverter main circuit 12, and the three-phase PWM signal shown in FIG. 4 transmitted from the three-phase PWM waveform creation unit 17 to the three-phase PWM inverter main circuit 12, and transmits the three-phase currents to the three-phase voltage command calculation unit 16.

Then, the three-phase voltage command calculation unit 16 generates three-phase voltage commands Vw*, Vu* and Vv* from the transmitted three-phase currents, and transmits the three-phase voltage commands to the three-phase PWM waveform creation unit 17.

From the three-phase voltage commands Vw*, Vu* and Vv* transmitted to the three-phase PWM waveform creation unit 17, the three-phase voltage reference signal generation unit 21 generates different voltage reference signals Vu, Vv and Vw of three-phases (U phase, V phase, W phase). The level comparison unit 22 compares the three-phase voltage reference signals Vu, Vv and Vw with the three carrier waves Cry_e, Cry_m and Cry_l generated by the carrier wave generation unit 20 to generate a three-phase PWM signal. Specifically, as shown in FIG. 4, the three-phase voltage reference signals Vu, Vv and Vw are compared with the three carrier waves Cry_e, Cry_m and Cry_l generated by the carrier wave generation unit 20, and when a magnitude relation thereof changes, the signal is switched and transmitted to the three-phase PWM inverter main circuit 12. Thus, the three-phase PWM inverter main circuit 12 generates a new three-phase PWM signal (as shown by reference Tpu, Tnu, Tpv, Tnv, Tpw, Tnw) from the transmitted three-phase PWM signal to estimate a current supplied to the motor 10, thereby driving the motor 10.

In this embodiment, the three-phase voltage reference signal generation unit 21 generates the three-phase voltage reference signals Vu, Vv and Vw as described below. Specifically, as shown in FIG. 4, for the three-phase voltage reference signals Vu, Vv and Vw, the voltage reference signal Vv is in a maximum level, the voltage reference signal Vw is in a minimum level, and the voltage reference signal Vu is in an intermediate level between the voltage reference signals Vv and Vw.

For the three carrier waves Cry_e, Cry_m and Cry_l generated in order at a certain interval Ts by the carrier wave generation unit 20, the carrier wave Cry_e at earliest timing is compared with the voltage reference signal Vu in the intermediate level, the carrier wave Cry_l at latest timing is compared with the voltage reference signal Vw in the minimum level, and the carrier wave Cry_m at intermediate timing is compared with the voltage reference signal Vv in the maximum level.

As such, the carrier wave Cry_e earlier than that of the V phase is used to sample the U phase and the carrier wave Cry_l always later than that of the V phase is used to sample the W phase. Thus, when the three carrier waves Cry_e, Cry_m and Cry_l are increased, the U phase can ensure a sampling time sufficiently longer than the interval Ts of the carrier waves Cry_e, Cry_m and Cry_l. When the carrier waves Cry_e, Cry_m and Cry_l are reduced, the W phase can ensure a sampling time sufficiently longer than the interval Ts of the carrier waves Cry_e, Cry_m and Cry_l. Thus, the current can be easily detected.

Figure 5:
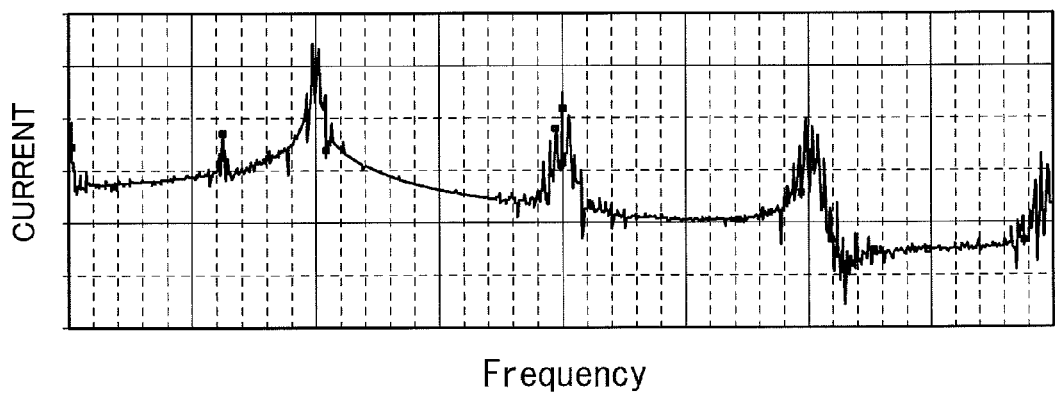
FIG. 5 shows a frequency analysis result of a current when the three-phase PWM signal shown in FIG. 4 is used.

Thus, as shown in FIG. 5, frequency components of the current flowing through the current sensor 14 are concentrated at a frequency of the carrier waves and n-fold thereof. This reduces frequency components around a resonance frequency on the side of the DC power supply 13, and reduces a sideband of the current flowing through the current sensor 14 to concentrate spectrum, thereby reducing a ripple current. This can prevent resonance with the ripple current from causing trouble to other devices connected to the DC power supply 13.

In the embodiment, combinations are set of comparison between the three-phase voltage reference signals Vu, Vv and Vw and the three carrier waves Cry_e, Cry_m and Cry_l generated in order at the certain interval Ts, so that the U phase and the W phase can ensure the sampling time sufficiently longer than the interval Ts of the carrier waves Cry_e, Cry_m and Cry_l when the three carrier waves Cry_e, Cry_m and Cry_l are increased and when the carrier waves Cry_e, Cry_m and Cry_l are reduced, respectively. However, the combinations are not limited to those described above.

Figure 6:
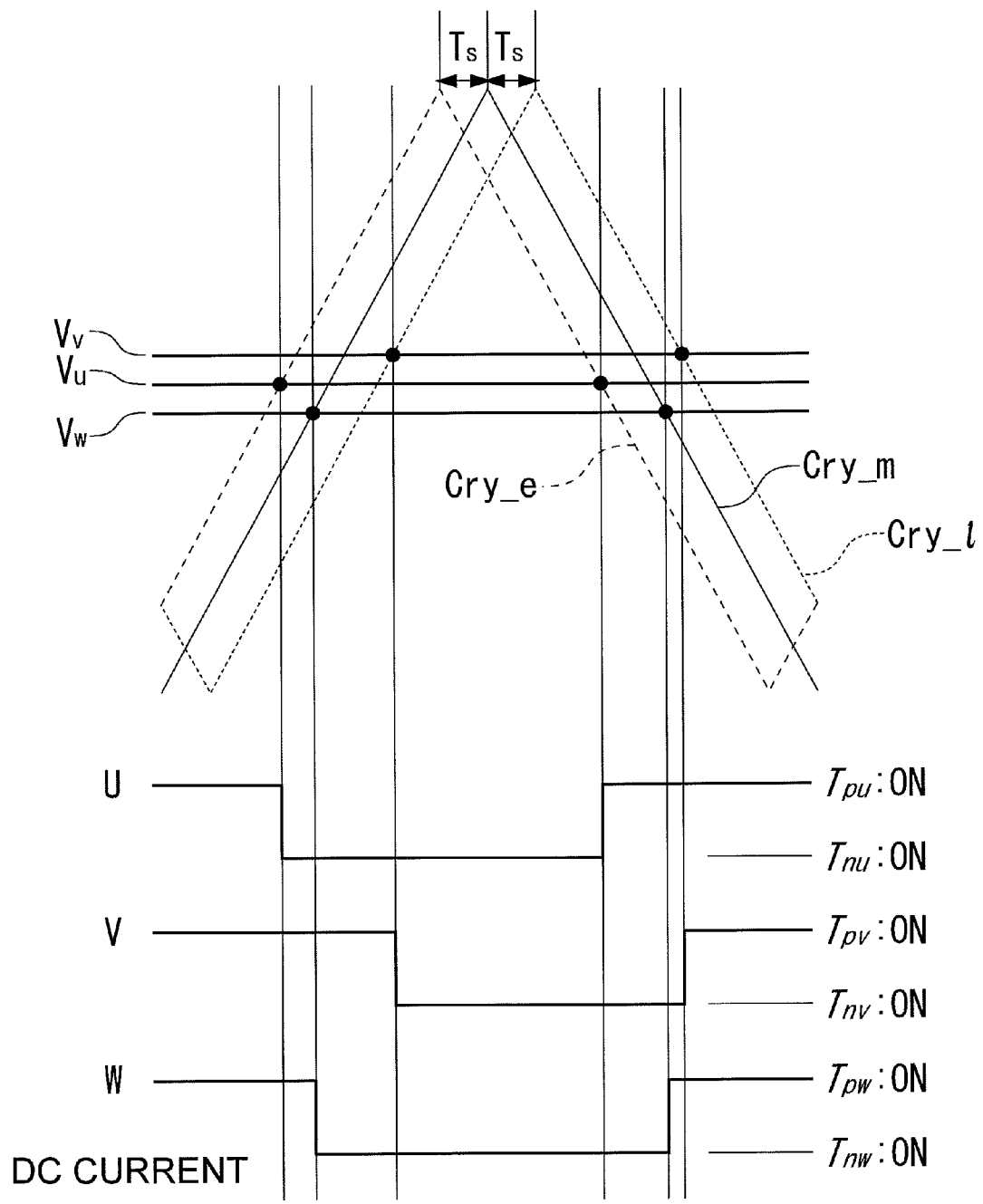
FIG. 6 is a timing chart showing another example for illustrating that a three-phase PWM signal is generated using the three carrier waves Cry_e, Cry_m and Cry_l in the inverter control device.
Figure 7:
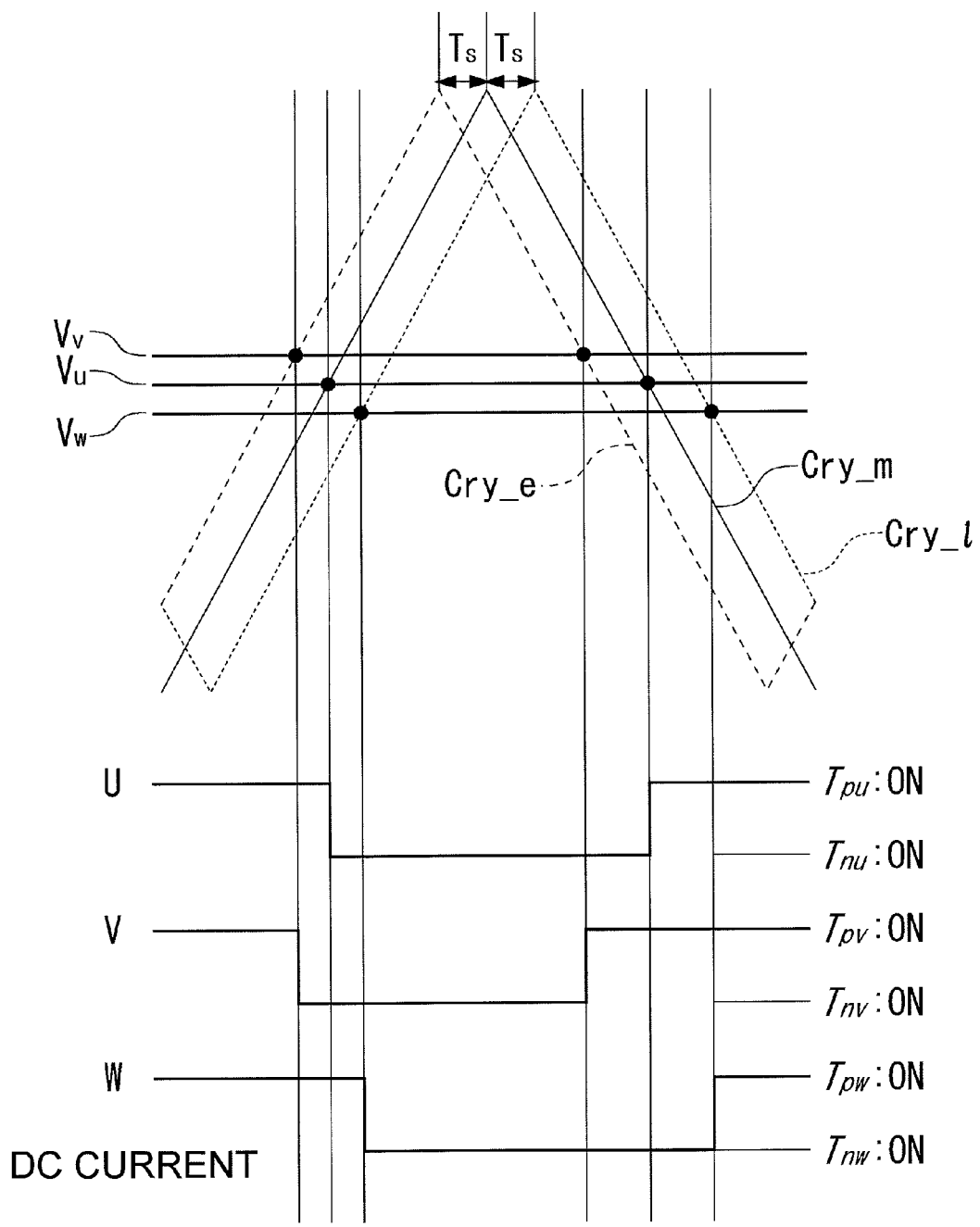
FIG. 7 is a timing chart showing a further example for illustrating that a three-phase PWM signal is generated using the three carrier waves Cry_e, Cry_m and Cry_l in the inverter control device.
Figure 8:
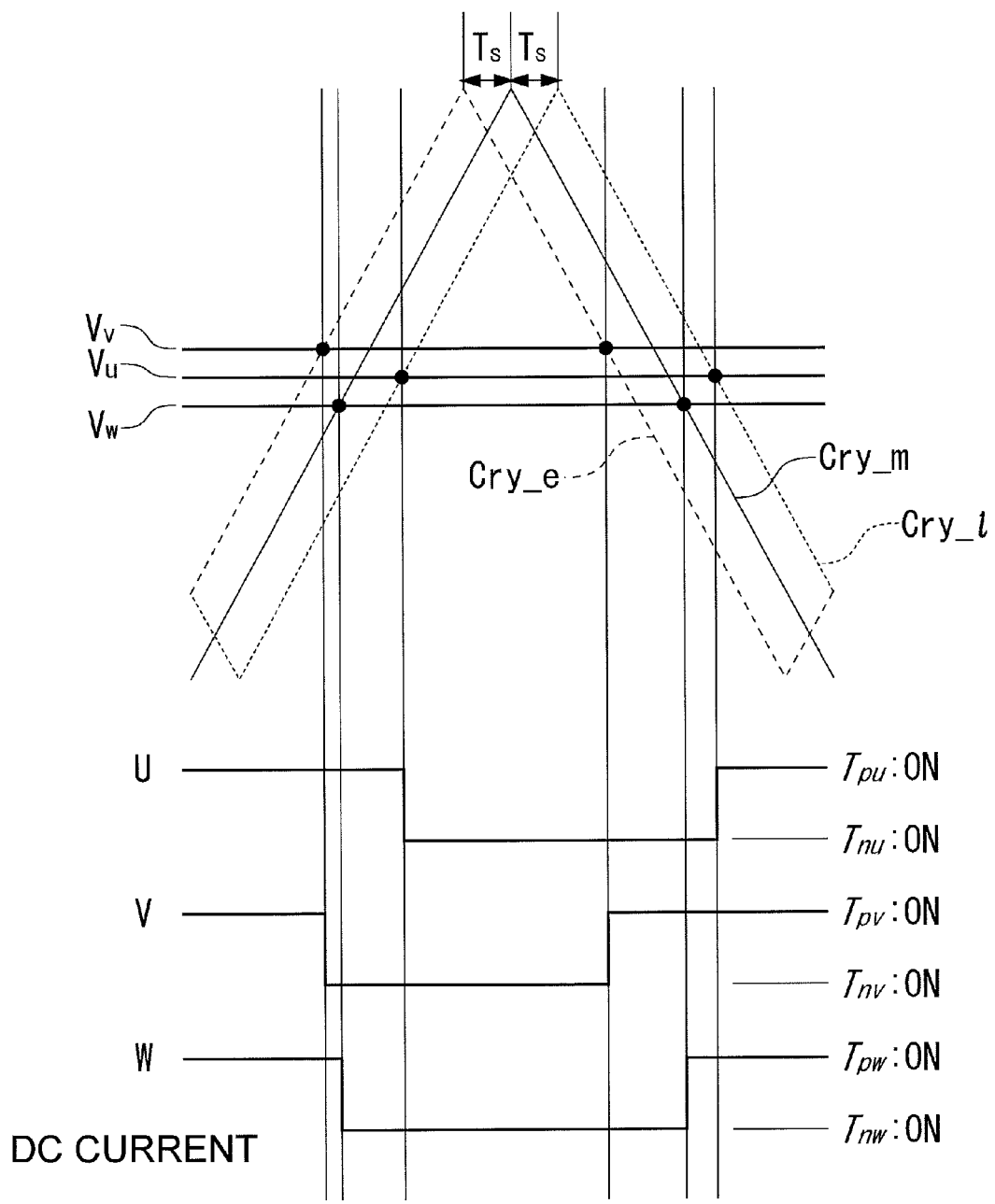
FIG. 8 is a timing chart showing a further example for illustrating that a three-phase PWM signal is generated using the three carrier waves Cry_e, Cry_m and Cry_l in the inverter control device.
Figure 9:
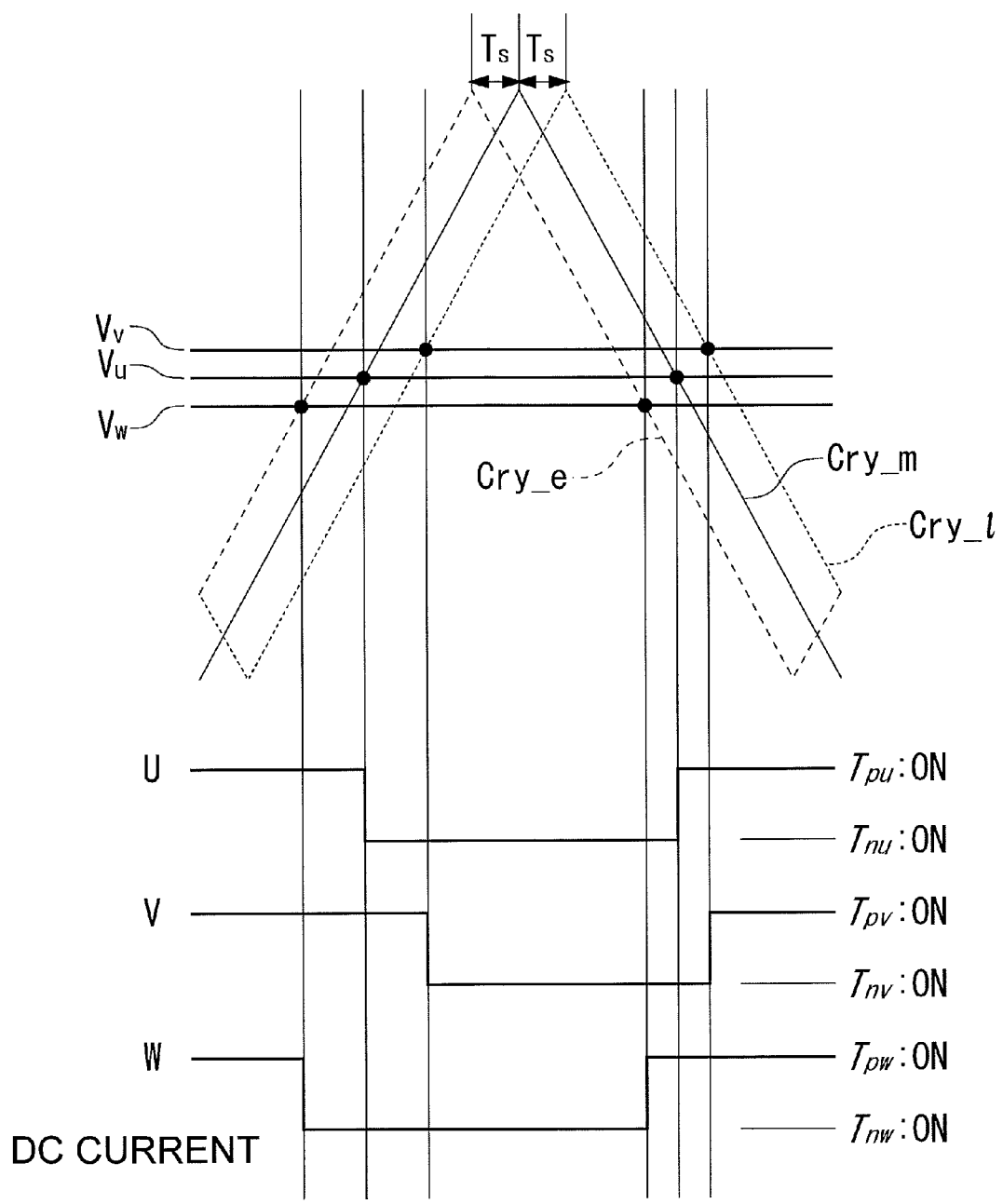
FIG. 9 is a timing chart showing a further example for illustrating that a three-phase PWM signal is generated using the three carrier waves Cry_e, Cry_m and Cry_l in the inverter control device.
Figure 10:
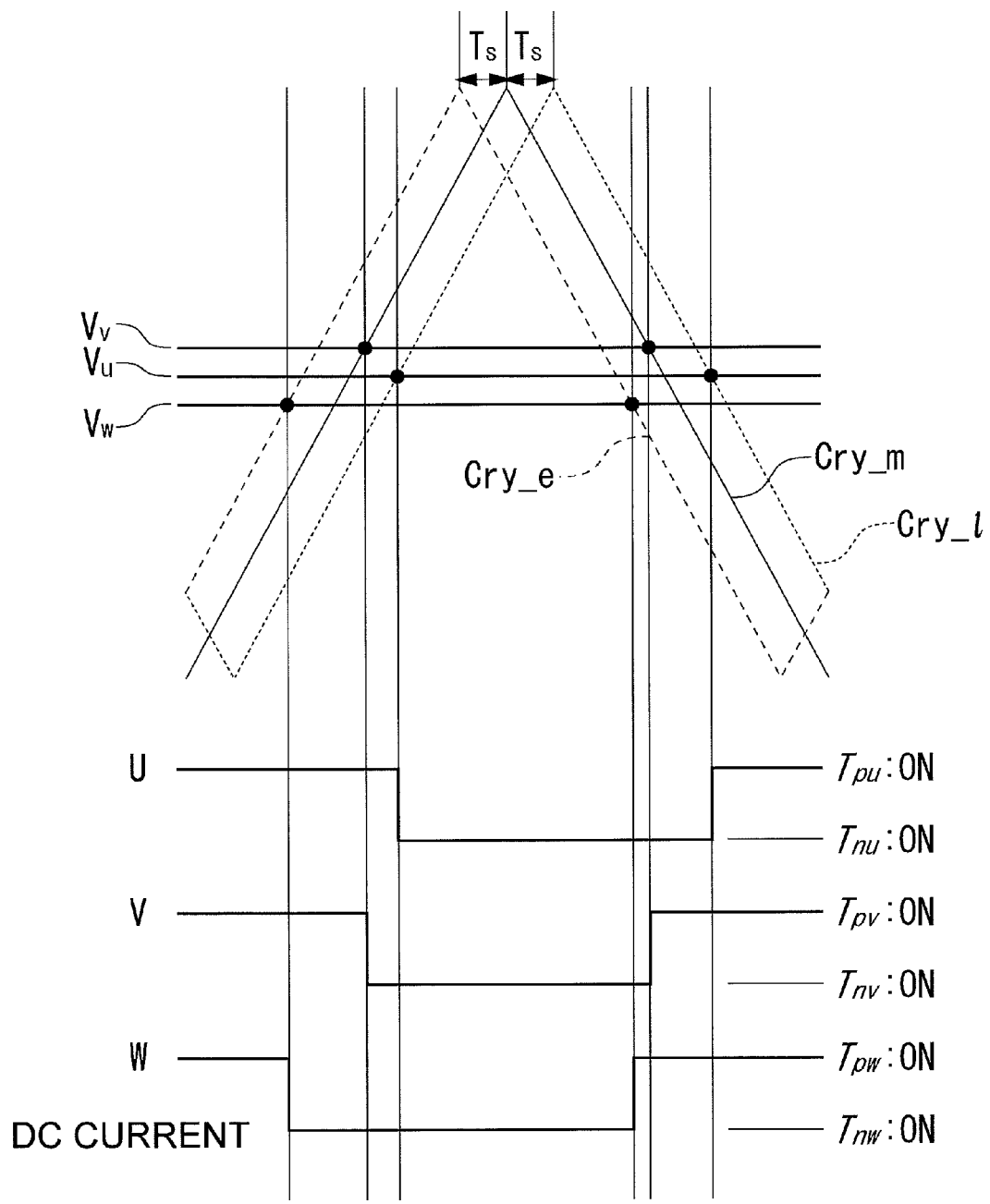
FIG. 10 is a timing chart showing a further example for illustrating that a three-phase PWM signal is generated using the three carrier waves Cry_e, Cry_m and Cry_l in the inverter control device.

As shown in FIG. 6, a combination can be used in which the carrier wave Cry_e earlier than that of the W phase is used for sampling of the U phase, and the carrier wave Cry_l always later than that of the W phase is used to sample the V phase. Also, as shown in FIG. 7, a combination can be used in which the carrier wave Cry_e earlier than that of the U phase is used to sample the V phase, and the carrier wave Cry_l always later than that of the U phase is used to sample the W phase. Also, as shown in FIG. 8, a combination can be used in which the carrier wave Cry_e earlier than that of the W phase is used to sample the V phase, and the carrier wave Cry_l always later than that of the W phase is used to sample the U phase. Also, as shown in FIG. 9, a combination can be used in which the carrier wave Cry_e earlier than that of the U phase is used to sample the W phase, and the carrier wave Cry_l always later than that of the U phase is used to sample the V phase. Also, as shown in FIG. 10, a combination can be used in which the carrier wave Cry_e earlier than that of the V phase is used to sample the W phase, and the carrier wave Cry_l always later than that of the V phase is used to sample the U phase.

In the example shown in FIGS. 6 to 10, when the three carrier waves Cry_e, Cry_m and Cry_l are increased and/or when the carrier waves Cry_e, Cry_m and Cry_l are reduced, a sampling time sufficiently longer than the interval Ts of the carrier wave Cry_e, Cry_m and Cry_l can be ensured for two phases among the U phase, the V phase and the W phase, and the current can be easily detected.

Instead of ensuring a sampling time sufficiently longer than the interval Ts of the carrier wave Cry_e, Cry_m and Cry_l by the combinations of the comparison between the three-phase voltage reference signals Vu, Vv and Vw and the three carrier waves Cry_e, Cry_m and Cry_l generated in order at the certain interval Ts, a sampling time sufficiently longer than the interval Ts of the carrier wave Cry_e, Cry_m and Cry_l can be ensured by changing the three-phase voltage reference signals Vu, Vv and Vw.

Figure 11B:
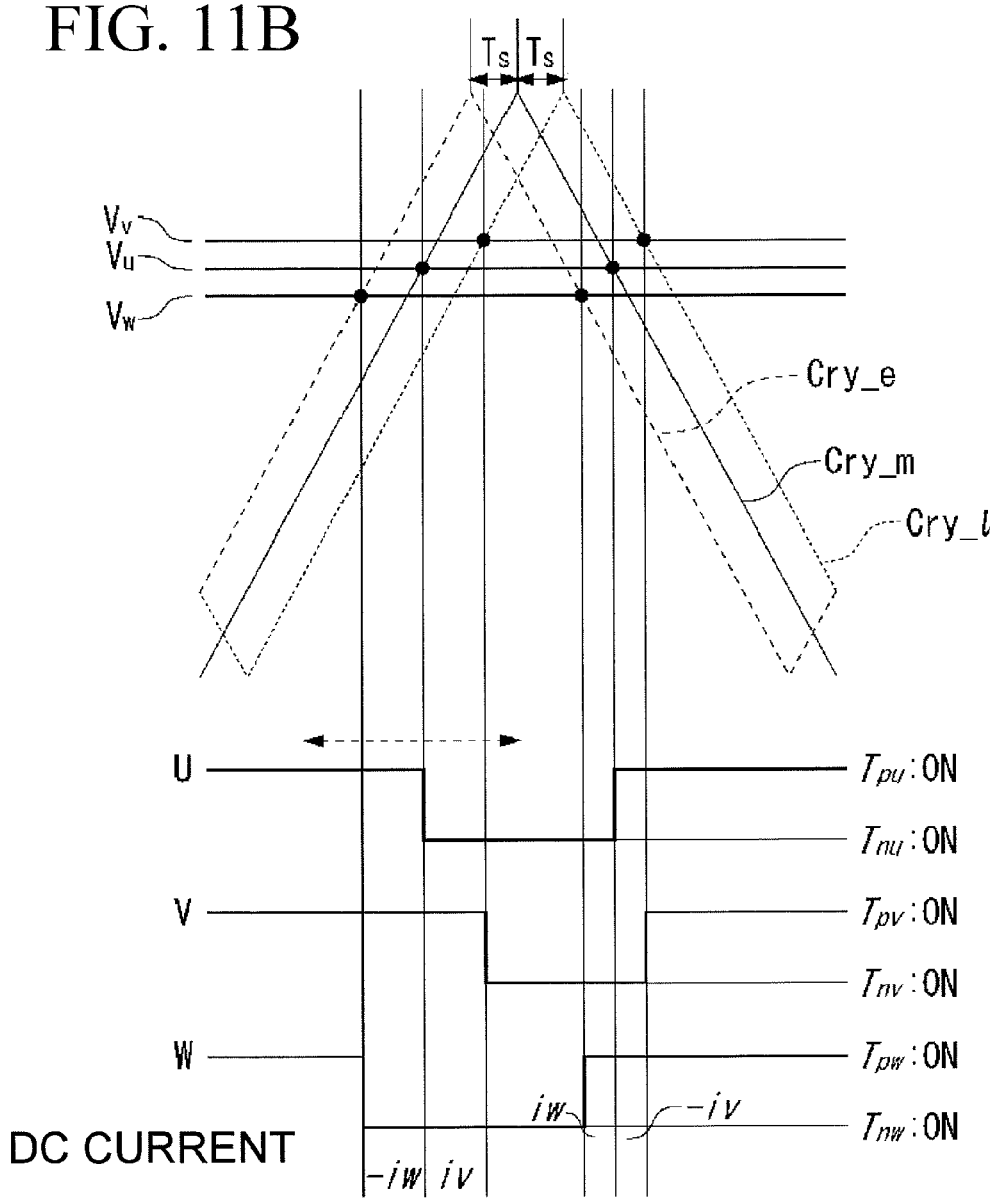

Specifically, as shown in FIGS. 11A and 11B, levels of the three-phase voltage reference signals Vu, Vv and Vw are generally changed to detect the current while shifting timing of switching at random. The current is detected while the levels of the three-phase voltage reference signals Vu, Vv and Vw are increased or reduced by quasi-white noise such as an M-series signal with a difference between the phases being maintained. Then, the timing of switching caused by comparison between the carrier waves Cry_e, Cry_m and Cry_l and the three-phase voltage reference signals Vu, Vv and Vw is changed at random.

At this time, the inverter control device 11 outputs a line voltage, and no problem occurs even if a voltage command is moved up and down with the difference between the phases being maintained as shown in FIG. 11.

Figure 12:
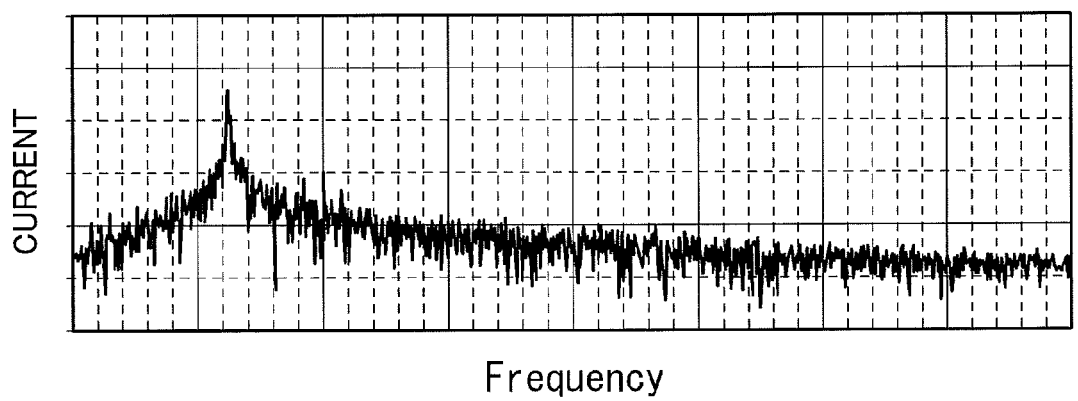
FIG. 12 shows a frequency analysis result of a current when the three-phase PWM signal shown in FIG. 11 is used.
Figure 13:
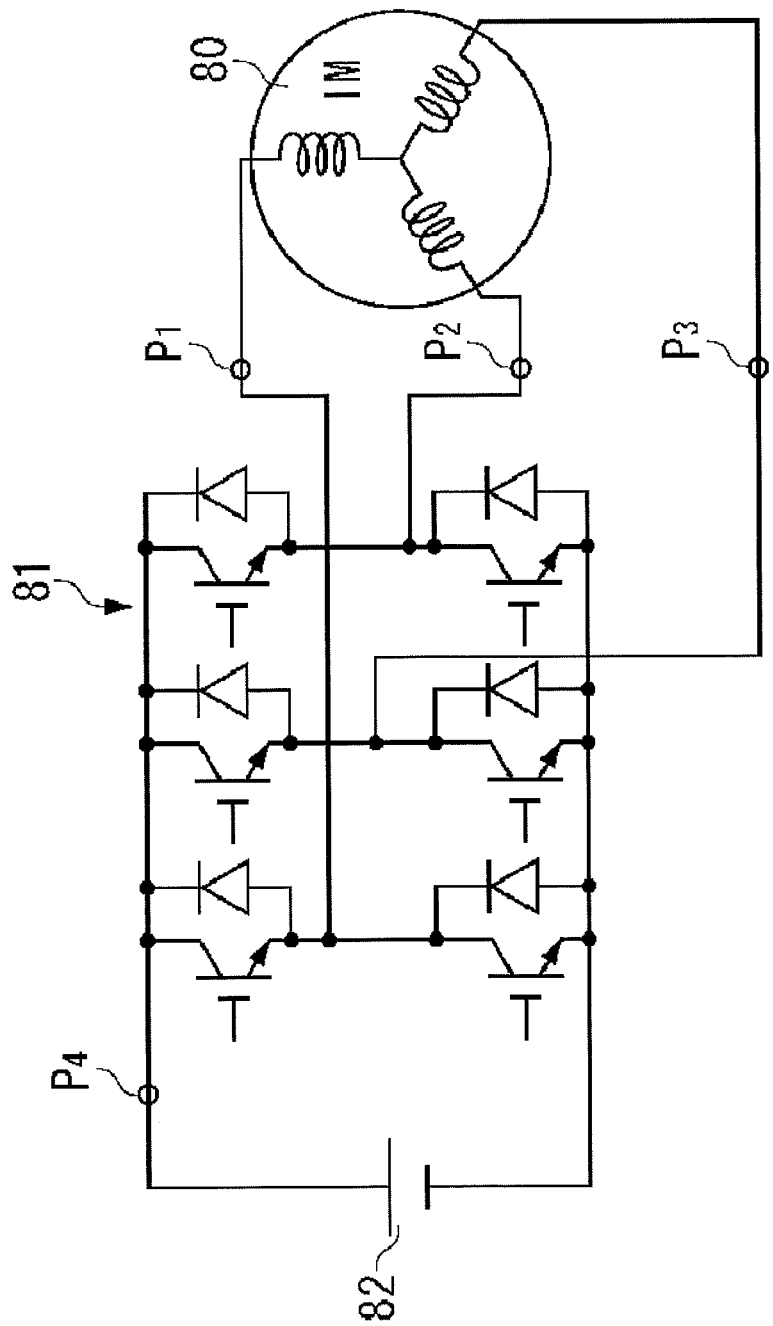
FIG. 13 shows a circuit configuration of a conventional inverter control device for an AC motor.
Figure 14:
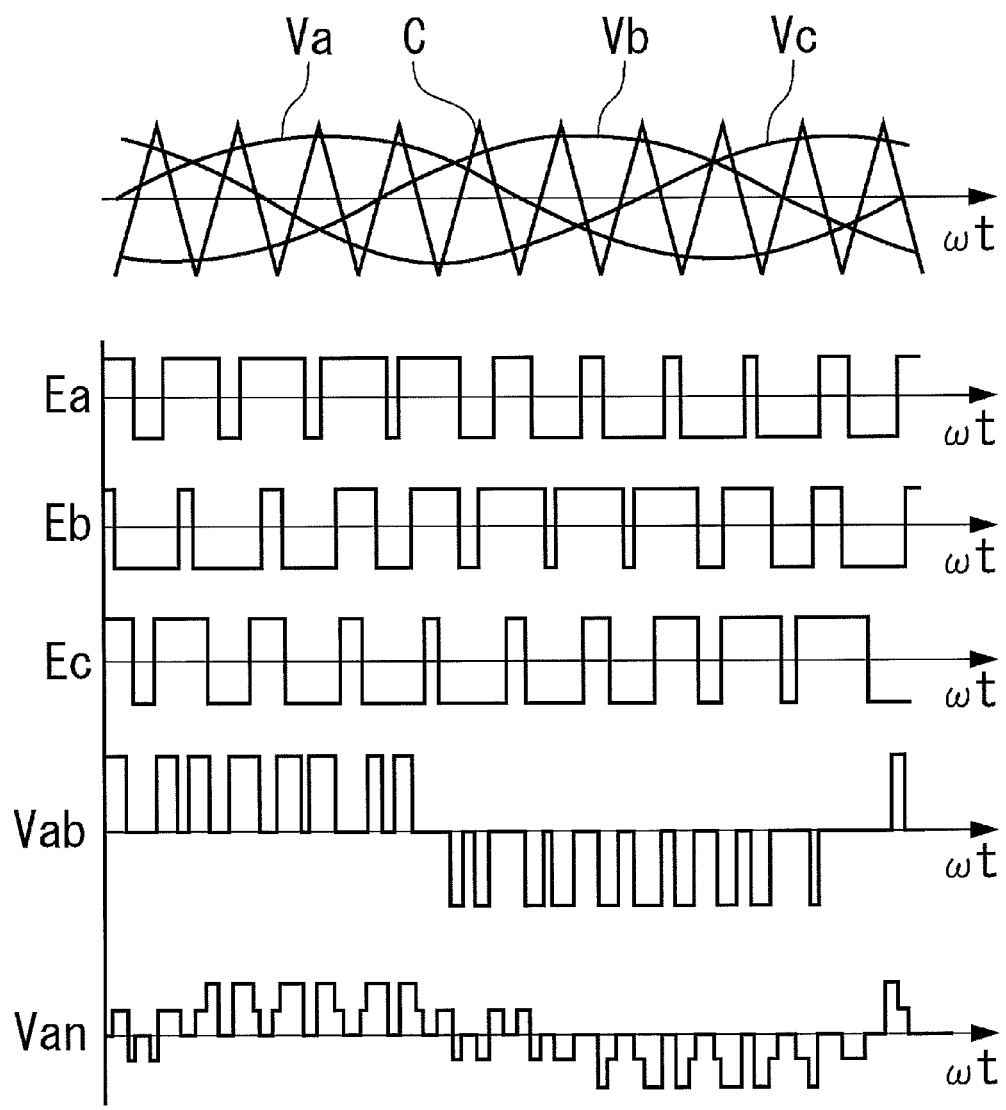
FIG. 14 is a timing chart showing a driving waveform in a conventional control device for an AC motor using a three-phase PWM inverter.
Figure 15:
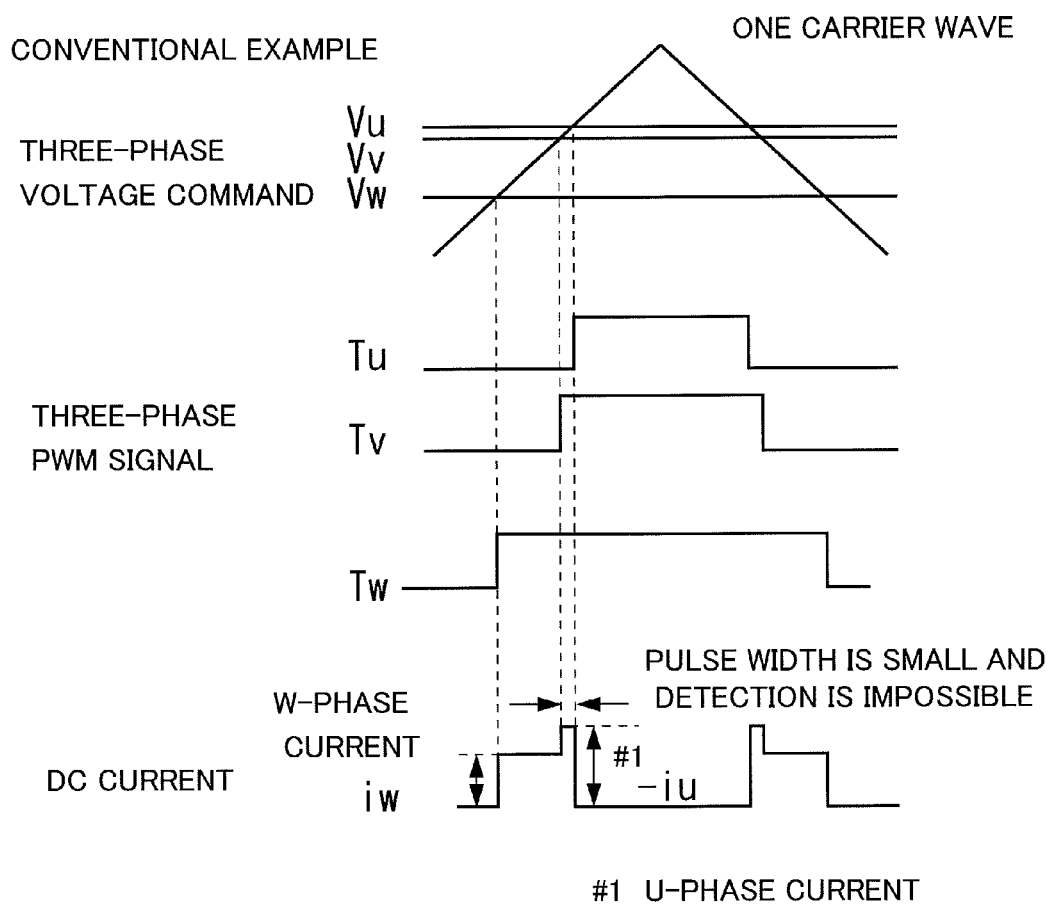
FIG. 15 is a timing chart for illustrating a phenomenon in which with one carrier wave in a conventional control device for an AC motor, a current cannot be detected if an intermediate phase of voltage command values is close to a maximum or minimum phase or an output voltage level is low.
Figure 16:
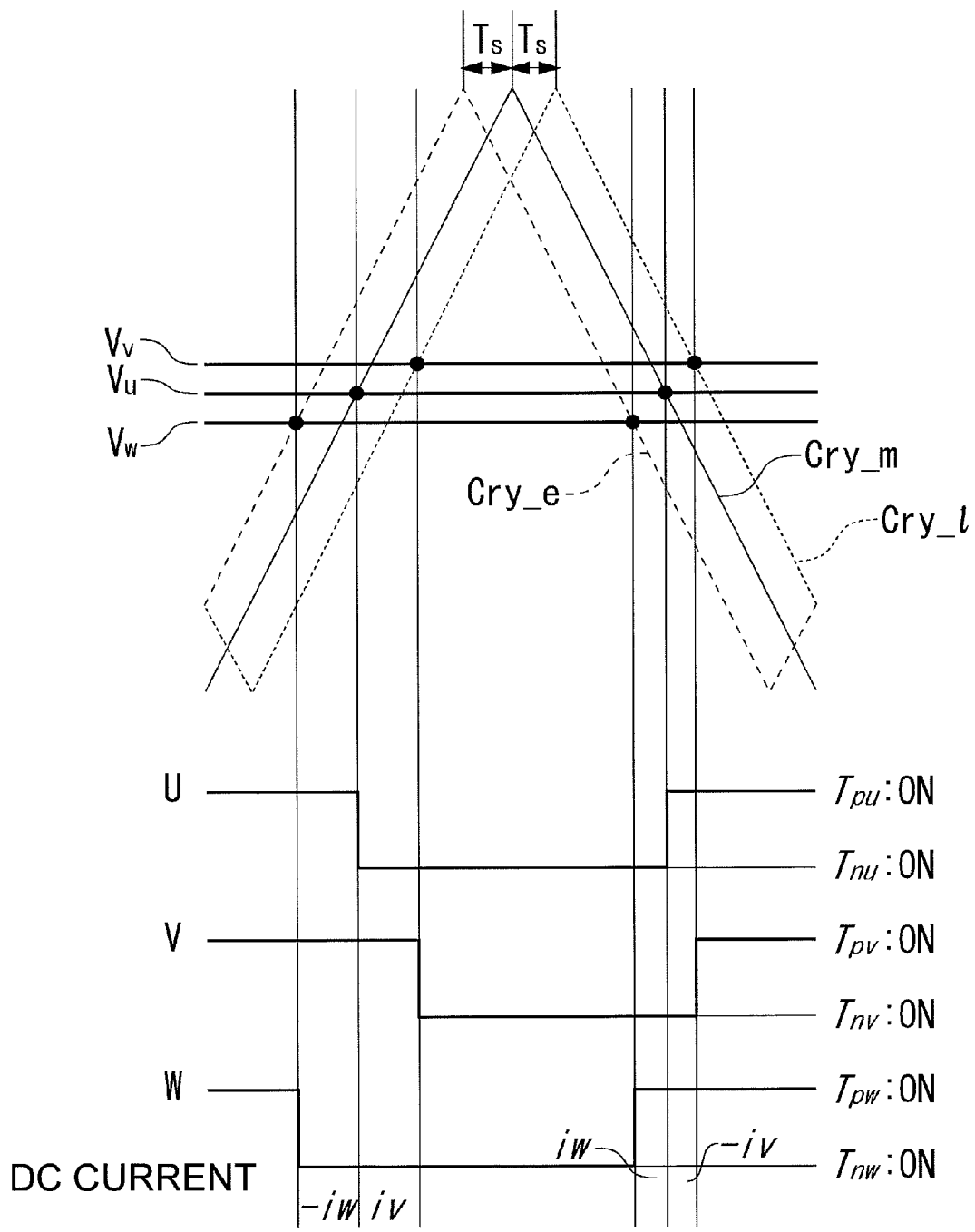
FIG. 16 shows a conventional relationship between three carrier waves and three-phase voltage reference signals and a three-phase PWM signal generated thereby.
Figure 17:
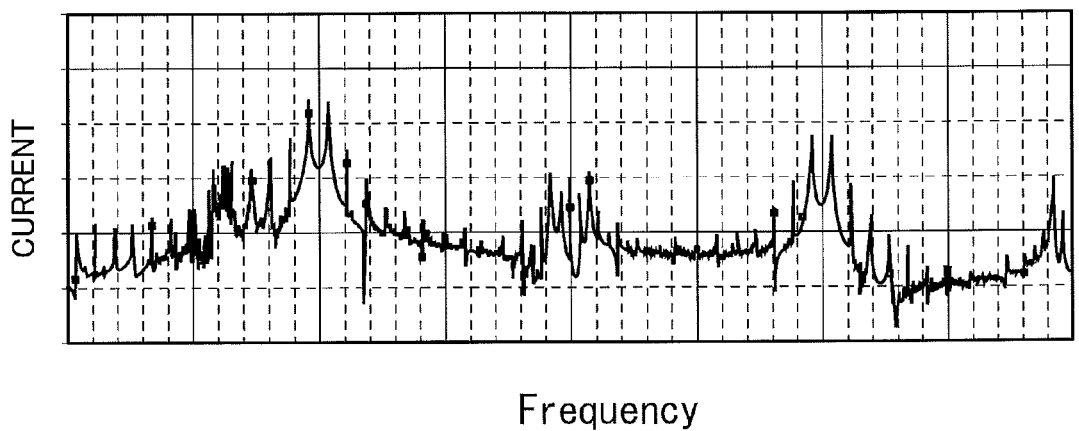
FIG. 17 shows a frequency analysis result of a current when the three-phase PWM signal shown in FIG. 16 is used.
Figure 18:
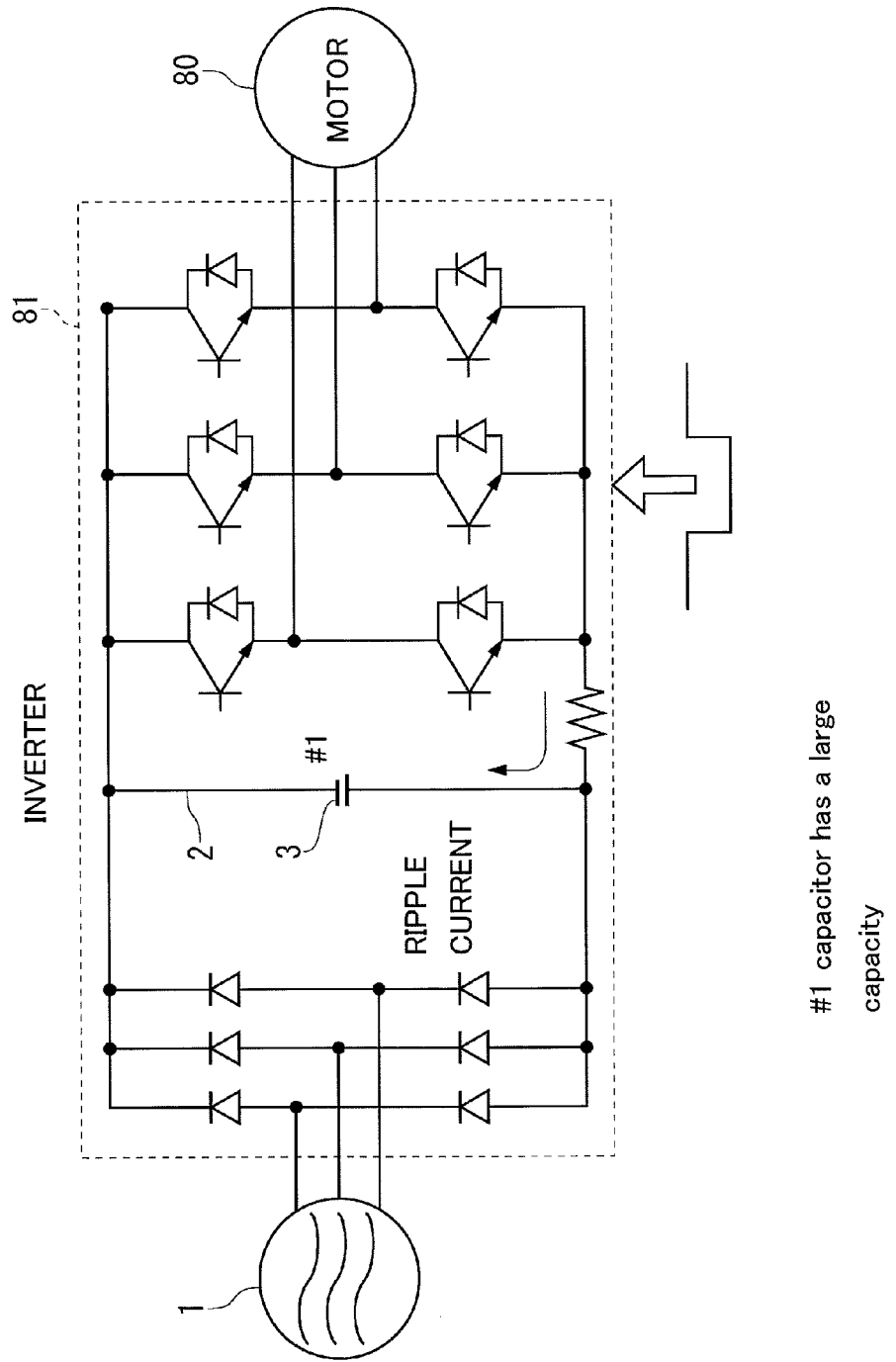
FIG. 18 shows a circuit configuration of an inverter control device when a power supply is AC.
Figure 19:
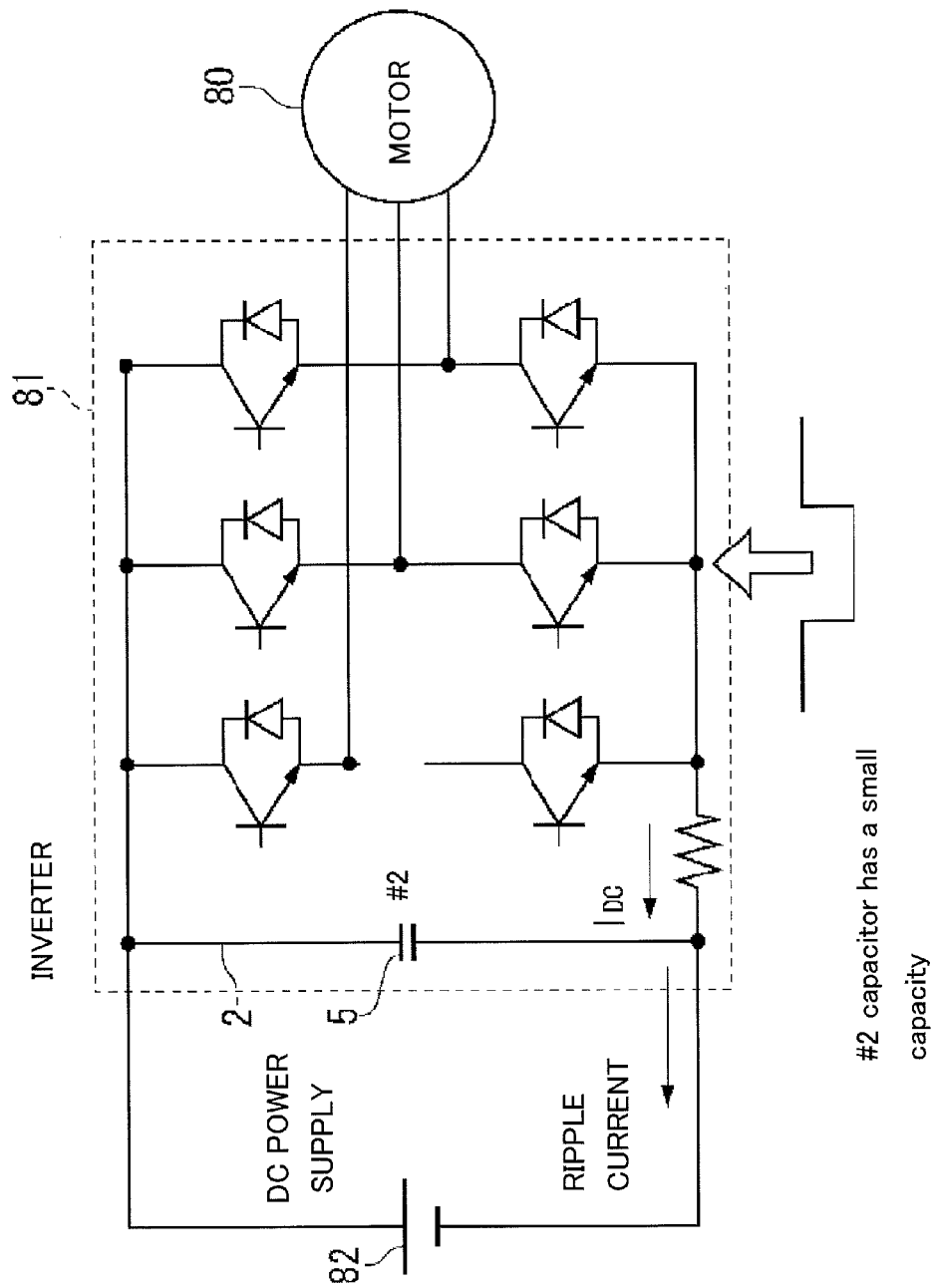
FIG. 19 shows a circuit configuration of an inverter control device when a power supply is DC.

FIG. 12 shows a result of switching during moving up and down of the carrier waves Cry_e, Cry_m and Cry_l while shifting the three-phase voltage reference signals Vu, Vv and Vw as described above.

As shown in FIG. 12, the sideband of the current flowing through the current sensor 14 was increased to spread spectrum, but the ripple current was increased as compared with that in FIG. 5. It is supposed that the spectrum is spread not only to the sideband but also to the carrier wave components, and the components around the resonance frequency are generally increased.

In the embodiment, the integral electric compressor is described, but the compressor and the inverter control device 11 may be separately provided.

Further, the configurations described in the embodiment may be chosen or changed to other configurations without departing from the gist of the present invention.

REFERENCE SIGNS LIST 10 motor (AC motor)
11 inverter control device (control device)
12 three-phase PWM inverter main circuit (three-phase PWM inverter)
13 DC power supply
14 current sensor (DC input current measuring means)
15 AC motor current detection unit
16 three-phase voltage command calculation unit
17 three-phase PWM waveform creation unit
20 carrier wave generation unit
21 three-phase voltage reference signal generation unit
22 level comparison unit
100 electric compressor
101 housing

The invention claimed is:

1. An on-vehicle electric compressor comprising:
a compressor that constitutes an on-vehicle air conditioner;
a motor for driving the compressor; and
a control device that controls an operation of the motor,
wherein the on-vehicle air conditioner comprises a DC power supply constituted by an on-vehicle battery,
the control device includes a three-phase PWM inverter that drives the motor by inputting DC supplied from the DC power supply, and DC input current measuring means to the three-phase PMW inverter, the control device estimates a current supplied to the motor from a measurement result of the DC input current measuring means to control the motor,
the control device includes:
a motor current detection unit that is connected to the DC input current measuring means and calculates each of three-phase currents in the motor;
a three-phase voltage command calculation unit that calculates a three-phase voltage command provided to the motor from the three-phase currents calculated by the motor current detection unit; and
a three-phase PWM waveform creation unit that has a carrier wave generation unit that generates three carrier waves having a certain interval Ts, and generates a control signal of the three-phase PWM inverter by level comparison between three-phase voltage reference signals of a U phase, a V phase and a W phase that constitute the three-phase voltage command calculated by the three-phase voltage command calculation unit and the carrier waves generated by the carrier wave generation unit, and
the DC input current measuring means detects a DC current with a sampling time of the certain interval Ts or more for one phase among the U phase, the V phase and the W phase when the three carrier waves are increased, and detects a DC current with a sampling time of the certain interval Ts or more for one phase among the U phase, the V phase and the W phase also when the three carrier waves are reduced.

* * * * *